United States Patent [19]

Hashimoto et al.

[11] Patent Number: 4,724,131
[45] Date of Patent: Feb. 9, 1988

[54] METHOD FOR PRODUCING α-FORM SILICON NITRIDE

[75] Inventors: Tadanori Hashimoto, Takatsuki; Kazuhiko Nakano, Katano; Norio Matsuda, Ibaraki, all of Japan

[73] Assignee: Sumitomo Chemical Company, Limited, Osaka, Japan

[21] Appl. No.: 921,808

[22] Filed: Oct. 20, 1986

Related U.S. Application Data

[63] Continuation of Ser. No. 740,521, Jun. 3, 1985, abandoned.

[30] Foreign Application Priority Data

Jun. 7, 1984 [JP] Japan ................ 59-117570
Jun. 7, 1984 [JP] Japan ................ 59-117571
Jun. 7, 1984 [JP] Japan ................ 59-117572
Oct. 12, 1984 [JP] Japan ................ 59-214808

[51] Int. Cl.$^4$ ........................... C01B 21/068
[52] U.S. Cl. ........................ 423/344; 423/406
[58] Field of Search ................... 423/344, 406

[56] References Cited

FOREIGN PATENT DOCUMENTS

| 80050 | 6/1983 | European Pat. Off. ............ 423/344 |
| 131894 | 1/1985 | European Pat. Off. ............ 423/344 |
| 53-133600 | 11/1978 | Japan . |
| 23917 | 8/1979 | Japan . |
| 58-091005 | 5/1983 | Japan . |
| 59-107976 | 6/1984 | Japan . |
| 59-203714 | 11/1984 | Japan ........................... 423/344 |

OTHER PUBLICATIONS

Journal of the Ceramic Association, Japan, 85 [11], 537–542 (1977), with English Abstract.
J. Am. Ceram. Soc., 65 (12) C-205 (1982).
Journal of Materials Science 10 (1975), pp. 1243–1246.

*Primary Examiner*—Jack Cooper
*Attorney, Agent, or Firm*—Stevens, Davis, Miller & Mosher

[57] ABSTRACT

A method for producing α-form silicon nitride having a central particle diameter of 0.3 to 1.0 μm (α-$Si_3N_4$) of high-grade and fine powder for its sintered body excellent in heat-stability and mechanical strength which comprises heat-treating at 1,450°–1,550° C., in an atmosphere containing nitrogen, a mixture prepared by adding one of additives:

(a) a mixture of at least one of Be, Sr, Ge, Sn, Ti, Hf and compounds thereof with 0.01–1 part by weight of silicon nitride powder having a BET specific surface area of 15 to 50 m$^2$/g and consisting substantially of the α-form crystal, and (b) a mixture of Zr and compounds thereof with 0–1 part by weight of silicon nitride powder having a BET specific surface area of 15 to 50 m$^2$/g and consisting substantially of the α-form crystal, in a total amount of 0.001–0.1 part by weight calculated in terms of elemental weight(s) of Be, Sr, Ge, Sn, Ti, Hf and Zr and 1 part or less by weight of silicon nitride powder having a BET specific surface area of 15 to 50 m$^2$/g and consisting substantially of the α-form crystal, to 1 part by weight of silicon oxide powder of 1 to 100 μm in central particle diameter and 0.4–4 parts by weight of carbon powder.

4 Claims, No Drawings

METHOD FOR PRODUCING α-FORM SILICON NITRIDE

This application is a continuation of application Ser. No. 740,521, filed June 3, 1985, now abandoned.

The present invention relates to a method for producing α-form silicon nitride (α-Si₃N₄) fine powders of 0.3 to 1.0 μm in central particle diameter, and it provides a method for producing a high-quality fine α-form silicon nitride powder in good yields.

Silicon nitride is superior in thermal resistance and high-temperature strength, and its sintered body is expected as a high-strength heat-resisting material or high-precision abrasion-resisting material, for example as a material which makes it possible to realize the increase in temperature, reduction in weight and increase in efficiency of heat engines such as Diesel engines, gas turbines, etc. These thermal and mechanical properties of the sintered body depend largely upon the property of a material for the sintered body, and as such material, a high-quality α-form silicon nitride fine powder having both a shape similar to a sphere of not more than 1 μm in particle diameter and a sharp particle diameter distribution is required.

The well-known synthetic methods for silicon nitride are as follows:

(i) Direct nitridation of metallic silicon,

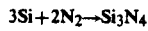

(ii) reduction-nitridation of silicon oxide,

(iii) gas-phase synthesis with silane or silicon tetrachloride, etc.,

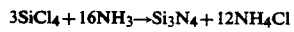

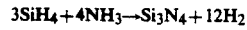

(iv) thermal decomposition of silicon diimide, silicon tetraamide, etc.

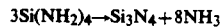

But, the method (i) has a defect that heat generation on direct reaction between metallic silicon powder and nitrogen gas is so violent that control of the reaction is difficult. The methods (iii) and (iv) have a feature that the fine powder of high-purity is easily obtained, but the powder obtained is an amorphous silicon nitride powder as very fine as, generally, 100 to 200 Å so that it is not suitable in its form as a sintering material. Consequently, this powder is commonly crystallized by further heat-treatment at a temperature of 1,300° to 1,500° C. in a nitrogen gas atmosphere, but there are defects that it is difficult to obtain a powder having a high proportion of α-form silicon nitride, and besides that, since needle-like crystals and rod-like ones are contained as contaminants in the powder obtained on this crystallization, it is difficult to control the particle shape of the powder. Of the foregoing methods, the method (ii) is a useful one in industry in that the materials are available at a relatively low cost, the reaction operation is relatively easy, the materials used have no such dangers as corrosion of equipments, explosion, etc., and besides that silicon nitride having a high proportion of α-form silicon nitride is easily obtained. As the defect of this method, however, there are given two problems described below. One problem is that: Generally, only particles of several microns (μm) in size are obtained even though well carefully selected silicon oxide fine powder and carbon powder are used as materials, and yet in some cases, said particles contain needle-like crystals and rod-like ones, so that it is not easy to obtain a uniform α-form silicon nitride fine powder having a shape similar to a sphere of not more than 1 μm in particle diameter. The other problem is that, when the carbon to silicon oxide ratio of the material is small, the nitridation conversion is so low that unreacted silicon oxide remains. These problems become noticeable as an increase in the particle diameter of the silicon oxide powder used and form a great hindrance to obtaining the α-form silicon nitride fine powder at a lower cost.

In order to solve these defects, there are proposed a method in which the nitridation conversion is increased by adding the oxide of iron, manganese, magnesium or the like as a catalyst (refer to Yogyo Kyokai-shi, Vol. 85 [II], 537-542, 1977), a method in which a silicon nitride powder is added to expect its seed effect [Japanese Patent Publication No. 23917/1979; Japanese Patent Application Kokai (Laid-open) No. 91005/1983; collection of Lectures on the 1st Symposium of Basic Technologies for Future Industries, pp. 27-46, November 11, 1983]. In the former method, however, the formed silicon nitride has a particle diameter of, generally, several microns (μm) and besides contains needle-like crystals and rod-like ones, though this method is reported to increase the nitridation conversion even though a silicon oxide powder of large particle diameter and a small carbon to silicon oxide ratio are used. This tendency becomes remarkable with an increase in the particle diameter of silicon oxide used as a material. In other words, this method promotes the nitridation, but it has a problem in terms of the control of the particle diameter and shape of silicon nitride particles formed, having little effect in an object of producing spherical fine powders. When iron oxide, manganese dioxide, cobalt oxide or chromium oxide referred to herein as a nitridation-promoting substance is added, silicon carbide is easily formed together with silicon nitride. And, addition of vanadium pentoxide facilitates the formation of β-form silicon nitride. Also, the latter method is reported to have effect to promote the nitridation and to promote the deposition of the formed silicon nitride because of the added silicon nitride powder acting as a nucleus. But these effects are hardly obtained when the carbon to silicon oxide ratio is small and the reaction temperature is as low as 1400° C. Further, when the particle diameter of silicon oxide used is not less than 1 μm, even though a large carbon to silicon oxide ratio and a high reaction temperature are used, the obtained silicon nitride powder is not sufficiently fine, non-uniform in particle shape and contains needle-like and rod-like crystals. In other words, this method has little effect when the silicon oxide used as a raw material has a particle diameter of not less than 1 μm. In the synthesis of silicon nitride by reduction-nitridation of silicon oxide, the cost of silicon oxide, a material, occupies a large percentage of the manufacturing cost of silicon nitride. The cost of silicon oxide depends upon its particle diameter, etc., and silicon oxide of less than 1 μm, for example 20 to 40 mμ, in particle diameter is relatively expensive. For lowering the manufacturing cost, therefore, it is desired to use a coarse and cheap silicon oxide having a particle diameter of not less than 1 μm as much as one can.

An object of the present invention is to provide an improved reduction-nitridation of silicon nitride.

Another object of the present invention is to provide a method for producing α-form silicon nitride fine powders having a high nitridation conversion.

A further object of the present invention is to provide a method for producing α-form silicon nitride fine powders having a shape similar to a sphere of 0.3–1.0 μm in average particle diameter.

A still further object of the present invention is to provide a method for producing α-form silicon nitride fine powders, wherein the reduction-nitridation can smoothly be advanced even though cheap silicon oxide of 1 to 100 μm in central particle diameter is used.

The present inventors made an extensive study and as a result, found that, in the above reduction nitridation of silicon oxide, when at least one of beryllium, strontium, germanium, tin, titanium, hafnium, zirconium and compounds thereof as well as a silicon nitride powder having a BET specific surface area of 15 to 50 m$^2$/g and consisting substantially of the α-form crystal are added, even though a silicon oxide coarse particle of not less than 1 μm in central particle diameter is used, uniform α-form silicon nitride fine powders having both a high nitridation conversion and a shape similar to a sphere of 0.3–1.0 μm in average particle diameter, can be obtained in good yields, and that, when zirconium or its compound is used, independently of the particle diameter of the silicon oxide used and even though a silicon nitride powder is not added, uniform α-form silicon nitride fine powders having both a high nitridation conversion and a particle shape similar to a sphere can be obtained in good yields. The present inventors thus attained to the present invention.

The present invention provides a method for producing α-form silicon nitride fine powders of 0.3 to 1.0 μm in central particle diameter characterized in that a mixture prepared by adding one of additives:

(a) a mixture of at least one of Be, Sr, Ge, Sn, Ti, Hf and compounds thereof with 0.01 to 1 part by weight of silicon nitride powder having a BET specific surface area of 15 to 50 m$^2$/g and consisting substantially of the α-form crystal, and (b) a mixture of Zr and compounds thereof with 0 to 1 part by weight of silicon nitride powder having a BET specific surface area of 15 to 50 m$^2$/g and consisting substantially of the α-form crystal, in a total amount of 0.001–0.1 part by weight calculated in terms of elemental weight(s) of Be, Sr, Ge, Sn, Ti, Hf and Zr and 1 part or less by weight of silicon nitride powder having a BET specific surface area of 15 to 50 m$^2$/g and consisting substantially of the α-form crystal, to 1 part by weight of silicon oxide powder of 1 to 100 μm in central particle diameter and 0.4–4 parts by weight of carbon powder, is heat-treated in a nitrogen-containing atmosphere to subject the silicon oxide of 1 to 100 μm in central particle diameter to reduction-nitridation.

The present invention will be illustrated in detail hereinafter.

It is desirable for the silicon oxide powder used in the present invention to have a central particle diameter of not more than 100 μm and as high a purity as possible. According to the present invention, even though silicon oxide fine powders of not more than 1 μm in central particle diameter are used, uniform α-form silicon nitride fine powders having both a central particle diameter of not more than 1 μm and a particle shape similar to a sphere can be obtained. But the cost of such silicon nitride fine powder is about 10 times as much as that of the fine powder obtained from silicon oxide powders of 1 to 100 μm in central particle diameter. Consequently, the α-form silicon nitride fine powder cannot be obtained at a lower cost, so that silicon oxide coarse powders of 1 to 100 μm in central particle diameter are preferred from the industrial point of view. When silicon oxide powders of more than 100 μm in central particle diameter are used, a mixing time in ball mills, etc. needs to be prolonged in order to obtain a uniform mixture of the powder and a carbon powder and a crushing effect if possible, or the silicon oxide powder before use needs to be crushed in advance . to not more than 100 μm by means of ball mills, vibrating mills, etc. When impurities such as B, Al and Zn compounds are contained in the silicon oxide powder, these compounds act to inhibit the reduction-nitridation. While, impurities such as compounds of V, Nb, Ta, Cr, Mo, W, Mn, Fe, Co, Ni, Cu and the like promote the formation of SiC and also facilitate the formation of needle-like crystals. It is therefore desirable for the silicon oxide powder used as a material not to contain these impurities as much as possible.

It is therefore desirable to use silicon oxide containing these metal-containing impurities in amounts not exceeding 0.3 wt. % as the total weight of these metallic elements. Such silicon oxide powder includes for example silicic acid anhydride, quartz, cristobalite, quartz glass and silica gel. It is however most desirable to use natural quartz powders which are cheaply available.

Similary, it is desirable to use carbon powder containing these metal-containing impurities in amounts not exceeding 0.3 wt. % as the total weight of these metallic elements. The typical carbon powder is acetylene black, furnace black, etc., and those having a particle diameter of more than several microns can be used. Speaking from the standpoint of handling, it is favorable to use granules or press-molded granules of about 0.3 to about 1.5 mm in size if they can be broken into fine powders on mixing.

The silicon nitride fine powder used as a seed in the present invention is one having a BET specific surface area of 15 to 50 m$^2$/g and an α-phase content of not less than 90%.

When the silicon nitride fine powder has a BET specific surface area of less than 15 m$^2$/g if its central particle diameter is not more than 1 μm, the effect of the present invention is not developed, as a result of which the central particle diameter of the formed α-form silicon nitride becomes as large as 1 μm or more and besides the silicon nitride comes to be contaminated with needle-like crystals and rod-like particles. Particularly, this phenomenon becomes remarkable when silicon oxide coarse particles of not less than 1 μm in particle diameter are used as a material.

Even though the specific surface area exceeds 50 m$^2$/g, a further improvement in the effect is not obtained. Also, to obtain such specific surface area is difficult and unfavorable in terms of cost and industrialization, so that the specific surface area is in the range of preferably not more than 50 m$^2$/g, more preferably 15 to 30 m$^2$/g.

Also, when the silicon nitride fine powder used contains less than 90% of the α-phase and more than 10% of the β- and amorphous phases, the formed silicon nitride becomes low in α-phase content and comes to be contaminated with needle-like crystals and rod-like particles. It is therefore desirable to use silicon nitride fine powders having an α-phase content of not less than 90%.

The central particle diameter of the α-$Si_3N_4$ fine powder used in the present invention is generally not more than 1 μm, preferably 0.3 to 0.8 μm.

Even the α-form silicon nitride fine powder having a central particle diameter of 0.3 to 0.5 μm synthesized by the method of the present invention has a specific surface area fairly smaller than 15 m²/g, and therefore, it is generally desirable to increase the specific surface area to not less than 15 m²/g by crushing on crushers such as vibrating mills, etc. having a strong impact-destructive power (impact value, 3G–15G). Also, in order to prevent the oxidation of silicon nitride powder on crushing, it is preferred to use an inert gas atmosphere such as nitrogen, argon, etc. In crushing with these crushers, silicon nitride powders of not more than 1 μm in particle diameter show little further change in particle diameter. Consequently, an increase in the specific surface area is considered to be due to that the surface of the particle becomes rough.

Ball mills commonly used, because of their small destructive power, hardly increases the specific surface area by about 200 hours' crushing.

On crushing, depending upon the material of crushers such as vibrating mills, etc., the crushed product is contaminated with metal impurities such as Al, Fe, Ni, W, etc. When such silicon nitride fine powder is used, a remarkable effect does not appear, the formed silicon nitride being contaminated with needle-like crystals and rod-like particles. In this case, it is desirable that the α-$Si_3N_4$ fine powder of which the BET specific surface area has been adjusted to 15 to 50 m²/g by treatment with crushers such as vibrating mills, etc. is washed with a mineral acid containing hydrofluoric acid before use.

When crushing has been applied, the surface of the silicon nitride fine powder is sometimes covered with an oxide, so that the above washing with a mineral acid is preferred also for the purpose of removing the oxide.

Beryllium and its compounds include for example metallic beryllium, beryllium oxide, beryllium hydroxide, beryllium fluoride, beryllium chloride, basic beryllium carbonate, beryllium nitrate, beryllium sulfate, beryllium nitride, etc. Strontium and its compounds include for example metallic strontium, strontium oxide, strontium hydroxide, strontium fluoride, strontium chloride, strontium carbonate, strontium nitrate, strontium sulfate, strontium isopropoxide, strontium nitride, etc. Germanium and its compounds include for example metallic germanium, germanium oxide, germanium sulfide, germanium fluoride, germanium chloride, germanium ethoxide, germanium nitride, germanium carbide, etc. Tin and its compounds include for example metallic tin, tin oxide, tin chloride, tin bromide, tin iodide, tin hydroxide, strontium stannate, etc. Titanium and its compounds include for example metallic titanium, titanium oxide, titanium chloride, titanium hydride, titanium sulfate, titanyl sulfate, titanium fluoride, strontium titanate, titanium nitride, titanium carbide, etc. Zirconium and its compounds include for example metallic zirconium, zirconium silicide, zirconium oxide, zirconium sulfate, zirconyl sulfate, zirconium chloride, zirconyl chloride, zirconium silicate, zirconium nitrate, zirconyl nitrate, zirconium fluoride, zirconium butoxide, zirconium carbide, zirconium nitride, etc. Hafnium and its compounds include for example metallic hafnium, hafnium chloride, hafnium carbide, hafnium nitride, etc. Generally, a silicon oxide powder, a carbon powder, a silicon nitride powder, metallic elements (i.e. beryllium, strontium, germanium, tin, titanium, zirconium and hafnium) and their compounds, which are used as materials, are mixed, in many cases, with addition of water on a wet-type ball mill in order to make the mixing more uniform. It is therefore more desirable to use the water-soluble compounds of said metallic elements than using the elements themselves. Also, the substances given above may be added alone or in mixtures of two or more of them.

In the present invention, when the amount of carbon powder added is less than 0.4 part by weight based on 1 part by weight of a silicon oxide powder, it results that, in the reduction-nitridation equation, $3SiO_2+6C+2N_2 \rightarrow Si_3N_4+6CO$, said amount is less than the equivalent weight so that unreacted $SiO_2$ remains While, when said amount is more than 4 parts by weight, formation of a β-form silicon nitride increases and besides the yield decreases. The amount of carbon powder added is, therefore, preferably 0.4 to 4 parts by weight, more preferably 0.5 to 1.2 parts by weight.

When the additive (a) is used, the amount of the silicon nitride powder added is preferably 0.01 to 1 part by weight based on 1 part by weight of the silicon oxide powder. When the amount of silicon nitride power is less than 0.01 part by weight, the effect of the powder to act as a nucleus on silicon nitride formation is hardly noticed, the uniform α-$Si_3N_4$ powder of more than 1 μm in particle diameter being obtained, and in some cases, said α-$Si_3N_4$ powder is contaminated with needle-like or rod-like crystals.

Contrary to this, when said amount is larger 0 than 1 part by weight, the α-$Si_3N_4$ powder obtained contains the added α-$Si_3N_4$ in larger amounts than the freshly formed α-$Si_3N_4$ thereby resulting in that, rather, the characteristics of the added α-$Si_3N_4$ unpreferably appears. From the practical point of view, a minimized amount of added α-$Si_3N_4$ powder is better for production efficiency, and therefore, it is desirable to add preferably 0.01 to 0.1 part by weight based on 1 part by weight of silicon oxide powder. While, when the additive (b) is used, uniform α-form silicon nitride fine powders having a high nitridation conversion as well as a particle shape similar to a sphere and a central particle diameter of not more than 1.0 μm are obtained without addition of the silicon nitride powder. But, by adding not more than 1 part by weight of the silicon nitride powder based on 1 part by weight of silicon oxide powder, the reaction can be carried out more preferably and uniform α-$Si_3N_4$ powders of not more than 1 μm in average particle diameter can be obtained. When the amount of the silicon nitride powder is larger than 1 part by weight based on 1 part by weight of silicon oxide powder, the α-$Si_3N_4$ powder obtained contains the added α-$Si_3N_4$ in larger amounts than the freshly formed α-$Si_3N_4$, thereby resulting in that, rather, the characteristics of the added α-$Si_3N_4$ unpreferably appears. From the practical point of view, a minimized amount of added α-$Si_3N_4$ powder is better for production efficiency, and therefore, it is desirable to add preferably 0.01 to 0.1 part by weight based on 1 part by weight of silicon oxide powder.

The amount of the foregoing metallic element (Be, Sr, Ge, Sn, Ti, Zr and Hf) is preferably within a range of 0.001 to 0.1 part by weight, as converted to the total weight of a beryllium or/and strontium or/and germanium or/and tin or/and titanium or/and zirconium or/and hafnium elements, based on 1 part by weight of the silicon oxide powder. Amounts less than 0.001 part by weight have little effect to promote the nitridation and to form the fine powder of $\alpha$-$Si_3N_4$. While, when the amount is more than 0.1 part by weight, the formed $\alpha$-$Si_3N_4$ contains large amounts of Be, Sr, Ge, Sn, Ti, Zr and Hf, being not preferred as a sintering material. More preferably, the amount is within a range of 0.001 to 0.03 part by weight.

In the present invention, for uniformly mixing the above materials and additives, the well-known methods can be used, there being no special limitation. Preferably, however, the silicon oxide powder, carbon powder, Be, Sr, Ge, Sn, Ti, Zr, Hf or compounds thereof and the silicon nitride powder are wet-mixed together with water.

For carrying out wet-mixing, mixing means such as ball mills, ceramic kneaders, etc. can be used, but selection of the material of the means is necessary in order that the mixture is not contaminated with impurities doing damage to reaction such as Fe, Al, etc. When a ball mill is used, it is generally preferred to use balls covered with quartz glass, silicon nitride or plastics and carry out mixing in plastic pots.

A carbon powder has a particle diameter of generally not more than several hundred millimicrons and a low specific gravity, so that it is difficult to handle. It is therefore desirable, as described above, to once form the powder into granules or press-molded particles having a particle diameter of about 0.3 to about 1.5 mm and mix with other materials using the above means.

When mixing is carried out according to the wet form, the resulting mixture is dried. But, for drying, it is preferred to use means such as spray drying, rotary evaporators, etc. so as to prevent separation of silicon oxide from carbon powder on drying owing to difference in specific gravity.

The mixture thus obtained is heat-treated in a nitrogen-containing atmosphere to subject it to reduction-nitridation. As such atmosphere, nitrogen-containing reaction gas systems such as $N_2$, $NH_3$, $N_2$—$H_2$, $N_2$—Ar, etc. may be used. The heat-treatment temperature may be selected from a range of 1,400° to 1,600° C., preferably 1,450° to 1,550° C. At temperatures lower than 1,400° C., long periods of time are required to advance nitridation sufficiently, while temperatures more than 1,600° C. unpreferably increases the formation of SiC.

That is, it is most suitable to keep a temperature of 1,450° to 1,550° C. for 2 to 6 hours also from the economical point of view.

Further, for the purpose of removing the residual carbon, it is desirable to carry out heat-treatment in an oxidative atmosphere, and generally, a suitable heat-treatment time is 1 to 4 hours, and the temperature of the heat-treatment is preferably within a range of 600° to 800° C.

As described above, the present invention includes adding the additive comprising a silicon nitride powder, the foregoing metallic element (Be, Sr, Ge, Sn, Ti, Zr and Hf) or its compounds to a silicon oxide powder and a carbon powder, mixing these substances, and heat-treating the resulting mixture in a nitrogen-containing atmosphere. By this method, not only the catalytic effect of said metallic element (Be, Sr, Ti, Sn, Ge, Hf) or its compounds on the reduction-nitridation, but also the fine powder-forming effect owing to reaction between these substances and the silicon nitride powder of 15 to 50 $m^2/g$ in BET specific surface area are developed. And, the $\alpha$-form silicon nitride fine powder having high contents of nitrogen and $\alpha$-$Si_3N_4$ and a shape similar to a sphere of 0.3–1.0 $\mu$m in average particle diameter can be obtained, which was so far difficult to obtain, when a silicon oxide powder having a particle diameter of 1 to 100 $\mu$m was used, by merely adding said metallic element, its compound or silicon nitride powder alone. Also, when zirconium or its compound is added, the uniform $\alpha$-form silicon nitride fine powder having a high nitridation conversion as well as a particle shape similar to a sphere and a central particle diameter of 0.3 to 1.0 $\mu$m is obtained without adding the silicon nitride powder, but the reaction can be carried out more preferably by adding the silicon nitride powder of 15 to 50 $m^2/g$ in BET specific surface area.

The $\alpha$-$Si_3N_4$ fine powder obtained by the present invention has a property to well disperse in water and alcohol solvents such as isopropyl alcohol, etc.

According to the present invention, production of the powdery material for silicon nitride sintered products superior in thermal resistance and high-temperature strength can be carried out more advantageously in industry.

Next, the present invention will be illustrated specifically with reference to the following examples, but the present invention is not to be interpreted as being limited thereto.

EXAMPLE 1

As a silicon oxide powder, a commercially available quartz sand powder (average particle diameter, 6 $\mu$m; BET specific surface area, 1.2 $m^2/g$) was used. As a carbon powder, press-molded products of commercially available acetylene black was used.

A silicon nitride powder was prepared as follows: A silicon nitride powder having a central particle diameter of 0.5 $\mu$m and a BET specific surface area of 7 $m^2/g$ as well as an $\alpha$-phase content of 98%, isopropyl alcohol (solvent) and silicon nitride balls were placed in a silicon nitride pot mounted on a vibrator and crushed for 100 hours according to the wet milling form, to obtain a powder.

This silicon nitride powder was added to a mixed solution comprising 50% aqueous hydrofluoric acid solution and 70% aqueous nitric acid solution in a volume ratio of 1 to 5 so that its concentration was 50 g/l, and the mixture was stirred for 1 hour, washed and dried to obtain a powder. This powder had the properties: Central particle diameter, 0.5 $\mu$m; BET specific surface area, 22 $m^2/g$; $\alpha$-phase content, 96%. This powder was taken as a seed silicon nitride powder.

As a catalyst, $Be(NO_3)_2.3H_2O$, $Sr(NO_3)_2.4H_2O$, $GeO_2$, $SnO_2$, $TiOSO_4$, $ZrO(NO_3)_2.2H_2O$ and $HfO_2$ were used.

These powders obtained above were mixed in proportions as shown in Table 1. Thereafter, the mixture, water and plastic-covered balls were added to a plastic pot and mixed for 2 hours according to the wet ball milling form. The resulting slurry-form mixture was added to a rotary evaporator and dried with heating under reduced pressure while rotating the evaporator.

The dried mixture was added to a graphite vessel and heat-treated for 6 hours at 1,500° C. and 1,550° C. while passing $N_2$ gas therethrough to subject $SiO_2$ to reduction-nitridation. The resulting powder was heat-treated at 700° C. for further 4 hours in air to combustion-remove the unreacted C. Thus, a $Si_3N_4$ fine powder was obtained.

The average particle diameter, N content and α-$Si_3N_4$ content, obtained from X-ray diffraction patterns, of every powder synthesized were shown in Table 1.

TABLE 1

| | | Composition of material (part by weight) | | | | | | | | | | | Reaction condition | | | Characteristics of product | | |
|---|---|---|---|---|---|---|---|---|---|---|---|---|---|---|---|---|---|---|
| | | | Seed | | | | Catalyst | | | | | | Temperature | Time | Atmosphere | Average particle diameter | N content | Amount of α-$Si_3N_4$ |
| | | $SiO_2$ | C | α-$Si_3N_4$ | Be | Sr | Ge | Sn | Ti | Zr | Hf | | (°C.) | (hr) | | (μm) | (%) | (%) |
| Example 1 | 1 | 1 | 0.8 | 0.1 | 0.01 | | | | | | | | 1550 | 6 | $N_2$ | 0.5 | 37.4 | 98 |
| | 2 | 1 | 0.8 | 0.1 | | 0.01 | | | | | | | 1550 | 6 | $N_2$ | 0.5 | 37.6 | 98 |
| | 3 | 1 | 0.8 | 0.1 | | | 0.01 | | | | | | 1500 | 6 | $N_2$ | 0.6 | 37.5 | 97 |
| | 4 | 1 | 0.8 | 0.1 | | | | 0.01 | | | | | 1500 | 6 | $N_2$ | 0.7 | 37.4 | 97 |
| | 5 | 1 | 0.8 | 0.1 | | | | | 0.01 | | | | 1500 | 6 | $N_2$ | 0.6 | 37.3 | 97 |
| | 6 | 1 | 0.8 | 0.1 | | | | | | 0.01 | | | 1500 | 6 | $N_2$ | 0.5 | 37.8 | 98 |
| | 7 | 1 | 0.8 | 0.1 | | | | | | | 0.01 | | 1500 | 6 | $N_2$ | 0.6 | 37.7 | 97 |
| | 8 | 1 | 0.8 | 0.1 | | 0.005 | | | | 0.005 | | | 1500 | 6 | $N_2$ | 0.5 | 37.8 | 97 |

EXAMPLE 2

An $Si_3N_4$ powder was synthesized according to the procedure of Example 1 using the same powders as used in Example 1 except that $BeCl_2.4H_2O$, BeO and $ZrOCl_2.8H_2O$ were used as a catalyst, and an α-$Si_3N_4$ powder (average particle diameter, 0.5 μm; BET specific surface area, 17 m²/g; and α-phase content, 96%) was used as a seed silicon nitride powder. The average particle diameter, N content and α-$Si_3N_4$ content of every powder obtained were also shown in Table 2.

EXAMPLE 3

An $Si_3N_4$ powder was synthesized according to the procedure of Example 2 using the same powders as used in Example 2 except that $ZrO(NO_3)_2.2H_2O$ was used as a zirconium source.

The average particle diameter, N content and α-$Si_3N_4$ content of every powder obtained were also shown in Table 3.

What is claimed is:

1. A method for producing silicon nitride powders comprising heat-treating a mixture of 1 part by weight of silicon oxide power of 1 to 100 μm in central particle diameter and 0.4 to 4 parts by weight of carbon powder in the presence of an additive of at least one member selected from the group consisting of Zr and Zr compounds in a total amount of 0.001 to 0.1 part by weight calculated in terms of elemental weight of Zr based on 1 part by weight of the silicon oxide powder, at 1450° to 1550° C. in a nitrogen-containing atmosphere to subject the silicon oxide to reduction nitridation; and recovering an α-form silicon nitride fine powder of 0.3 to 1.0 μm in central particle diameter.

2. A method for producing α-form silicon nitride fine powders of 0.3 to 1.0 μm in central particle diameter according to claim 1 characterized in that both said silicon oxide powder and said carbon powder contain impurities containing B, Al, Zn, V, Nb, Ta, Cr, Mo, W, Mn, Fe, Co, Ni and Cu in amounts not exceeding 0.3 wt. % as the total weight of these metallic elements.

3. A method for producing α-form silicon nitride fine powders of 0.3 to 1.0 μm in central particle diameter according to claim 1 characterized in that said zirconium compounds are zirconyl nitrate and zirconyl chloride.

4. The method of claim 1, including the step of adding 0.001 to 1 part by weight of silicon nitride powder having a BET specific surface area of 15 to 50 m²/g and consisting substantially of the α-form crystal based on 1 part by weight of the silicon oxide powder to the mixture prior to said heat-treating.

TABLE 2

| | | Composition of material (part by weight) | | | | | Reaction condition | | | Characteristics of product | | |
|---|---|---|---|---|---|---|---|---|---|---|---|---|
| | | | | Seed | Catalyst | | Temperature | Time | Atmosphere | Average particle diameter | N content | Amount of α-$Si_3N_4$ |
| | | $SiO_2$ | C | α-$Si_3N_4$ | Amount added | Compound | (°C.) | (hr) | | (μm) | (%) | (%) |
| Example 2 | 9 | 1 | 0.8 | 0.1 | 0.01 | $BeCl_2.4H_2O$ | 1500 | 6 | $N_2$ | 0.5 | 37.7 | 98 |
| | 10 | 1 | 0.8 | 0.1 | 0.01 | BeO | 1500 | 6 | $N_2$ | 0.6 | 37.6 | 98 |
| | 11 | 1 | 0.8 | 0.1 | 0.01 | $ZrOCl_2.8H_2O$ | 1500 | 6 | $N_2$ | 0.4 | 37.8 | 96 |

TABLE 3

| | | Composition of material (part by weight) | | | | Reaction condition | | | Characteristics of product | | | |
|---|---|---|---|---|---|---|---|---|---|---|---|---|
| | | $SiO_2$ | C | Zr | $Si_3N_4$ | Temperature (°C.) | Time (hr) | Atmosphere | Particle shape | Central particle diameter (μm) | N content (%) | α-Phase content (%) |
| Example 3 | 12 | 1 | 0.6 | 0.005 | — | 1,500 | 6 | $N_2$ | Sphere | 1.0 | 38.1 | 98 |
| | 13 | 1 | 0.6 | 0.005 | 0.05 | 1,550 | 4 | " | " | 0.5 | 37.7 | 98 |
| | 14 | 1 | 0.8 | 0.005 | 0.001 | 1,500 | 6 | " | " | 0.6 | 37.8 | 98 |
| | 15 | 1 | 0.8 | 0.001 | 0.001 | 1,500 | 6 | " | " | 0.6 | 38.0 | 98 |

* * * * *